US005692202A

United States Patent [19]
Kardach et al.

[11] Patent Number: 5,692,202
[45] Date of Patent: Nov. 25, 1997

[54] SYSTEM, APPARATUS, AND METHOD FOR MANAGING POWER IN A COMPUTER SYSTEM

[75] Inventors: James P. Kardach, Saratoga; Chih-Hung Chung, Santa Clara; Jason Ziller, Mountain View, all of Calif.

[73] Assignee: Intel Corporation, Santa Clara, Calif.

[21] Appl. No.: 581,164

[22] Filed: Dec. 29, 1995

[51] Int. Cl.⁶ .................................................. G06F 1/32
[52] U.S. Cl. ........................................... 395/750; 395/838
[58] Field of Search .................................. 395/750, 838, 395/837

[56] References Cited

U.S. PATENT DOCUMENTS

| | | |
|---|---|---|
| 4,477,873 | 10/1984 | McCarley ............................. 395/838 |
| 5,025,387 | 6/1991 | Frane . |
| 5,036,456 | 7/1991 | KoEgel ................................ 395/837 |
| 5,131,083 | 7/1992 | Crawford et al. . |
| 5,134,691 | 7/1992 | Elms . |
| 5,175,845 | 12/1992 | Little et al. . |
| 5,175,853 | 12/1992 | Kardach et al. . |
| 5,214,762 | 5/1993 | Bush et al. ........................... 395/838 |
| 5,239,638 | 8/1993 | Pawlowski et al. . |
| 5,317,750 | 5/1994 | Wickersheim et al. . |
| 5,333,307 | 7/1994 | Shirk et al. . |
| 5,353,420 | 10/1994 | Zaidi . |
| 5,369,771 | 11/1994 | Gettel . |
| 5,390,350 | 2/1995 | Chung et al. . |
| 5,392,023 | 2/1995 | D'Avello et al. . |
| 5,392,417 | 2/1995 | Iyengar et al. . |
| 5,396,635 | 3/1995 | Fung . |
| 5,398,244 | 3/1995 | Mathews et al. . |
| 5,404,546 | 4/1995 | Stewart . |
| 5,408,668 | 4/1995 | Tornai . |
| 5,410,711 | 4/1995 | Stewart . |
| 5,418,969 | 5/1995 | Matsuzaki et al. . |
| 5,428,790 | 6/1995 | Harper et al. . |
| 5,493,684 | 2/1996 | Gephardt et al. ..................... 395/750 |
| 5,511,013 | 4/1996 | Tokieda et al. ...................... 395/750 |
| 5,511,203 | 4/1996 | Wisor et al. ......................... 395/750 |
| 5,511,205 | 4/1996 | Kannan et al. ...................... 395/750 |
| 5,517,650 | 5/1996 | Bland et al. ......................... 395/750 |
| 5,524,248 | 6/1996 | Parks et al. ......................... 395/750 |

*Primary Examiner*—Jack B. Harvey
*Assistant Examiner*—Ario Etienne
*Attorney, Agent, or Firm*—Blakely, Sokoloff, Taylor & Zafman

[57] ABSTRACT

A computer system for monitoring the activity of a bus controller of a processor and responsive thereto for controlling the power consumption of a target controller such as a memory controller coupled to the bus controller. The computer system includes a bus, a processor having a bus controller coupled to the bus, and a bus activity monitor, coupled to the bus controller, generating a bus activity signal indicative of activity in the bus controller. The computer system also includes a target controller, coupled to the bus controller, for controlling the exchange of information between the processor and a target circuit. The target controller has an input for receiving a sequencing signal. The computer system additionally includes a power management circuit for controlling a power consumption of the target controller. The power management circuit has an input for receiving the bus activity signal and, an output for generating the sequencing signal in response to the bus activity signal.

18 Claims, 6 Drawing Sheets

SYSTEM, APPARATUS, AND METHOD FOR MANAGING POWER IN A COMPUTER SYSTEM

BACKGROUND OF THE INVENTION

1. Field of the Invention

The present invention relates to the field of power management. More specifically, the present invention relates to power management in computer systems.

2. Description of Related Art

With the advent of mobile computers and mobile computer systems it has become increasingly important to minimize power consumed by these devices or systems. One major consumer of power, in mobile computer systems, is the central processing unit (CPU). Microprocessors, consume appreciable amounts of power, each time a clock pulse occurs. Existing power management systems have focused their attention on reducing the power consumed by the CPU. As it is well known, the amount of power consumed by the CPU is proportional to the frequency of the clock sequencing the operation of the CPU. Because CPUs spend a large percentage of time in idle loops, waiting for input-output operations to complete, waiting for operator input, etc., most power management systems have concentrated on reducing CPU clock speed during periods of CPU inactivity and during periods wherein the operations performed by the CPU do not require high clock frequencies.

A significant amount of power, however, is consumed by other parts of the computer, besides the CPU. For example, the chipset or host Peripheral Component Interconnect (PCI) bridge is a significant consumer of power. Some parts of the chipset which consume substantial amounts of power, however, are not required to be functional during certain periods of time. For example, a dynamic random access memory (DRAM) controller, which is a circuit in the chipset responsible for controlling the exchange of information between a DRAM and a host CPU or between the DRAM and other external circuits such as a PCI bus, may not be required to operate at full speed or at all when the CPU or the PCI bus are not exchanging information with the DRAM. PCI bus architecture is explained in detail in the PCI Local Bus Specification, Revision 2.1 of the PCI Special Interest Group of Portland, Oreg.

FIG. 1 shows a computer system inducting a host CPU 2 having a bus controller 4 responsible for the exchange of information between the host CPU 2 and other devices connected to a local bus 6. A chipset 10 is coupled to the host CPU 2 and to the local bus 6. The chipset 10 includes a memory controller 8 which controls the exchange of information between the CPU 2 and a memory 12. Memory 12, by way of example, could be a DRAM memory while memory controller 8 can be a DRAM controller.

In the event the CPU is not exchanging information with the chipset 10, via bus controller 4, no activity will take place between the bus controller 4 and the memory controller 8 of chipset 10. In this case, assuming that other devices which might be coupled to the memory controller 8, such as a PCI bus controller (not shown), are not accessing memory controller 8, it is desirable to reduce the power consumed by the idle memory controller 8. One way to reduce the power consumed by memory controller 8 would be to shut off the clock which provides periodical pulses to the memory controller 8. Since the power dissipated by a device sequenced by a clock having the frequency F, is proportional to F according to the formula, $$P = CV^2 F$$

where V is the voltage supplied to the memory controller, and C is the capacitance of the memory controller, the power dissipated would thus be substantially reduced if the frequency of the clock approached 0 Herz.

Current practices use clock gating techniques for shutting off the clock to a device. Such techniques, however, do not offer an intelligent way to shut off the clock of a device such as the memory controller of FIG. 1, because they do not take into account the fact that the memory controller, after having been shut off, may need to restart operation promptly upon the occurrence of a certain event. For example, if the bus controller 4 of FIG. 1, resumes activity due to the receipt of a bus request signal from a CPU core, (not shown in FIG. 1) the memory controller should timely resume activity to service a new DRAM access. In this case, conventional clock gating techniques do not offer an adequate mechanism for powering back the memory controller at the right time without wasting bus cycles.

It is thus desirable to provide an apparatus and a method for detecting events wherein power monitoring devices, which control a power dissipating device, can timely identify an event which requires the power controlled device to timely switch into a fully operational mode. More specifically, it is desirable to provide an apparatus and method according to which the power dissipated by a memory controller or any other devices coupled to the host bus, is regulated in instances where the CPU's bus controller and the PCI bus controller are idle. Additionally, it is desirable to provide for a method and apparatus for restoring the operation of the memory controller in coordination with the beginning of activity of the bus controller such that no bus cycles are wasted when the bus controller has become active. It is also desirable to provide the foregoing advantages to a computer system having other external devices coupled to the chipset such as a PCI bus, so that a portion of the chipset can be power controlled when both the CPU (master) and the external devices (slave) are not using a certain portion of the chipset coupled to both the master and the slave.

SUMMARY OF THE INVENTION

A computer system, according to the present invention, typically includes a bus, a processor with a bus controller, a bus activity monitor, a target controller, and a power management circuit. The bus controller, which is coupled to the bus, is also coupled to a bus activity monitor circuit for generating a bus activity signal indicative of activity in the bus controller. The computer system further includes a target controller, coupled to the bus controller, for controlling the exchange of information between the processor and a target circuit. The target controller has an input for receiving a sequencing signal. The computer system additionally includes a power management circuit for controlling a power consumption of the target controller. The power management circuit receives the bus activity signal and, in response to that signal, generates the sequencing signal to the input of the target controller.

BRIEF DESCRIPTION OF THE DRAWINGS

The features, aspects and advantages of the present invention will become more fully apparent from the following detailed description, appended claims, and accompanying drawings in which:

DETAILED DESCRIPTION OF THE INVENTION

In the following descriptions, numerous specific details are set forth to provide a thorough understanding of the present invention. However, one having ordinary skills in the art may be able to practice the invention without these specific details. In some instances, well-known circuits, structures and techniques have not been shown in detail not to unnecessarily obscure the present invention.

Figure 1:
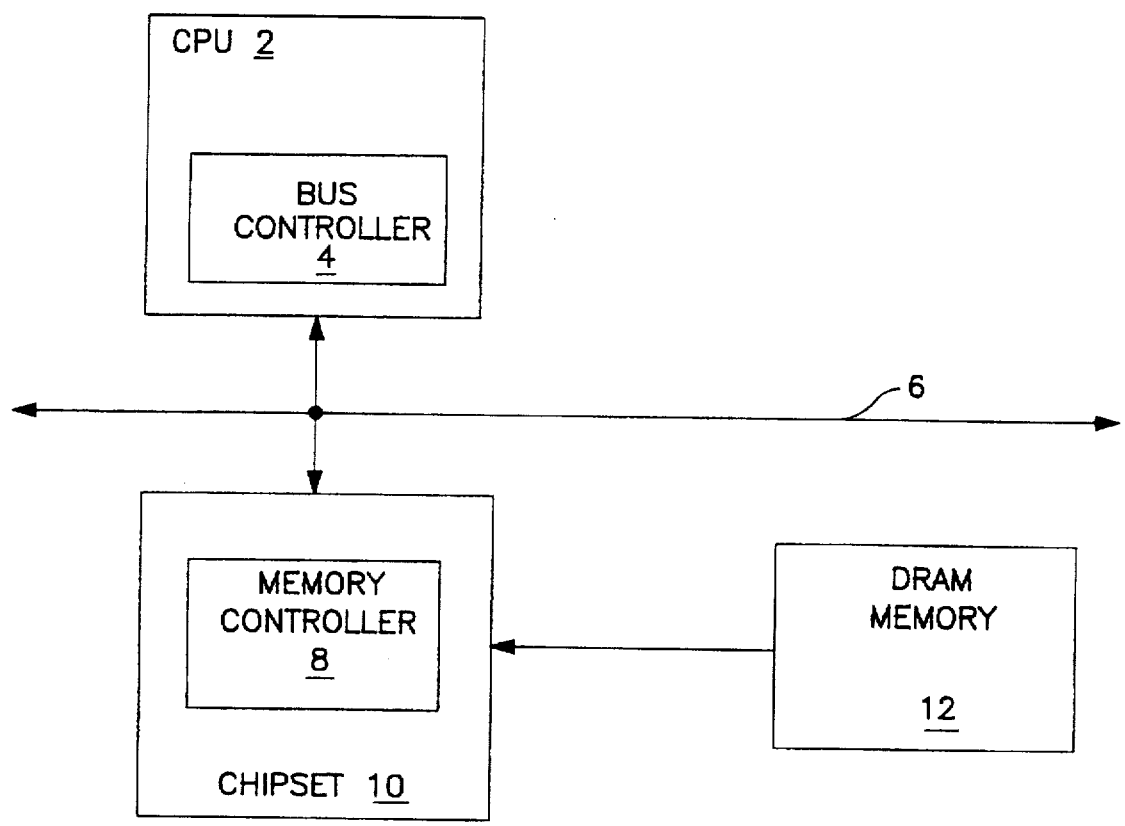
FIG. 1 is a block diagram of a prior art computer system.
Figure 2:
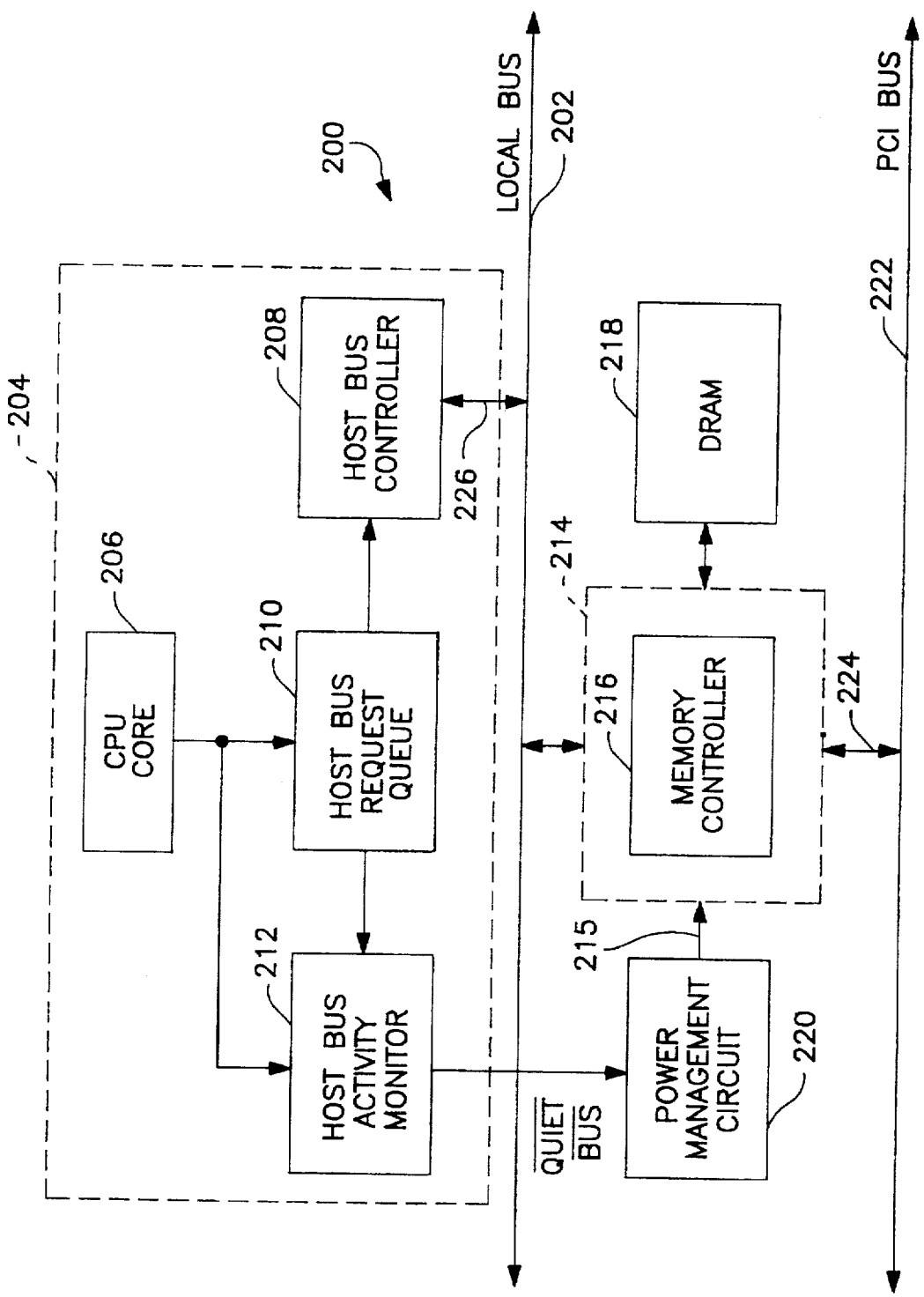
FIG. 2 is a block diagram of the computer system of the present invention.

Referring to FIG. 2, a computer system 200 according to the present invention includes local bus 202 and a microprocessor 204 coupled to local bus 202. Microprocessor 204 includes: a CPU core 206 for processing instructions and data; host bus controller 208 for controlling communication over a the local bus 202; a host bus request queue 210 for storing addresses addressable by the host bus controller, and a host bus activity monitor 212 coupled to the host bus request queue. The host bus activity monitor circuit 212 monitors activity or lack of activity in the host bus controller 208.

The computer system 200 further includes a host-PCI bridge 214 having a memory controller (MC) 216 for controlling accesses to main memory 18 which can be by way of non-limiting example a DRAM memory. The computer system according to the present invention further includes a power management circuit 220 for controlling the power consumption of the memory controller 216. Furthermore the computer system includes a PCI bus 222. For information regarding the PCI bus please refer to the PCI specification, revision 2.1 of the PCI Special Interest Group located in Portland, Oreg. The computer system of the present invention however is not limited to a PCI bus. Bus 222 can be any other bus enabling communication with host-PCI bridge 214 via line 224.

The power management circuit 220, which is coupled to the memory controller 214 via line 215, has an input gate which receives a $\overline{\text{QUIETBUS}}$ signal from the host bus activity monitor 212 and in response to this signal generates a control sequencing signal to the memory controller 216 via line 215. Such signal can be, by way of non-limiting example, a clock enable signal which controls the clock pulses sequencing the operation of the memory controller 216. The control of the sequential operation can be implemented by gating the control sequencing signal, issued by the power management circuit, to the clock signal as it will be explained later in this section. In such way, when the control sequencing signal from the power management circuit 220 is set at logic "0," the clock signal frequency in the memory controller can be inhibited. Accordingly, the power to the memory controller can be shut off in response to a signal indicating lack of activity in the host bus controller 208.

In one currently preferred embodiment, memory controller 208 coordinates data transfers between the host processor 204 and the DRAM memory 218, as well as the transfers between PCI bus 222 and memory 203. The present invention supports different types of bus transfers. In the currently preferred embodiment, bus transfers can be single cycle or multiple cycle, burst or non-burst, cacheable or non-cacheable, and consist of 8, 16, 32, or 64 bit transactions. The type of bus transfers in microprocessor 204 can be coordinated by the host bus controller, the memory controller, and the PCI bus.

The CPU core 206 typically initiates exchanges of information with other devices coupled to local bus 202 by means of bus cycles. A bus cycle is defined to be a number of clock cycles required for both the address and corresponding data transaction to occur. For example, if the CPU core 206 issues a read request, the address of the operation is first communicated across host bus 202 to a target device or target circuit such as memory 218. The memory 218 then responds by providing data across host bus 204 to CPU core 206. The exchange of information between the host and the other devices coupled to the host bus 202 is coordinated by host bus controller 208.

Figure 3:
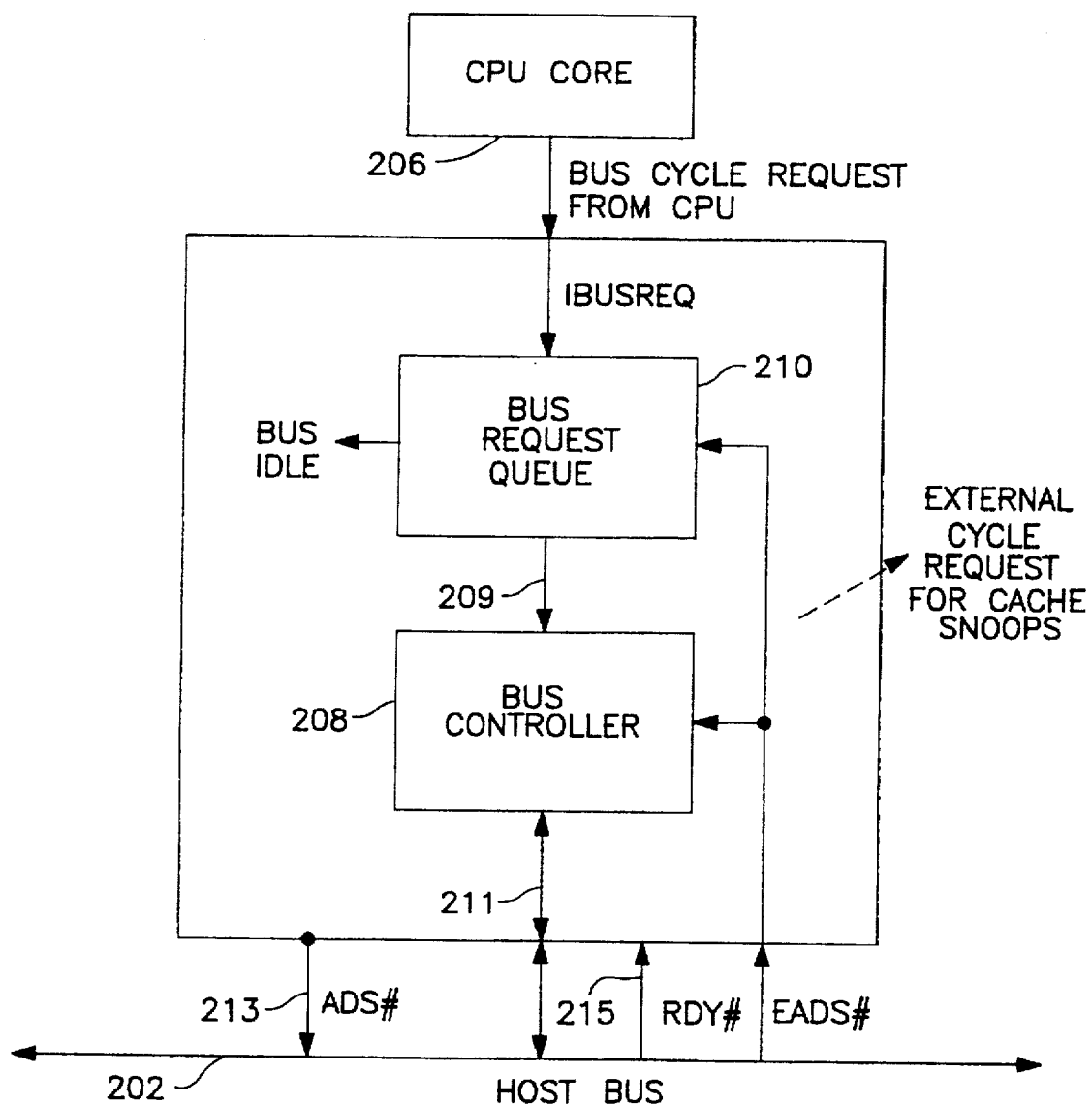
FIG. 3 shows a portion of a processor of the computer system according to the present invention.

A portion of the processor 204 including host bus controller 208 and the host bus request queue 210 is shown in FIG. 3. Bus controller 208 includes a bus controller state machine (not shown) which typically receives an internal bus cycle request signal (IBUSREQ) from the CPU core 206 and a bus cycle external request signal ($\overline{\text{EADS}}$) from the host/PCI bridge 214. Similarly, an external cycle request for cache snoops can be communicated to the host bus controller 208 from a cache controller (not shown). The host bus request queue 210 typically receives a signal IBUSREQ indicating that the CPU is about to use the host bus 202 by performing a read or a write operation in conjunction with this bus. The host bus request queue 210 will communicate the internal request from the CPU core to the host bus controller 208 via line 209. The host bus controller 208 then will issue bus cycles onto the host bus 202 via a bus interface (not shown in this figure).

Typically, the host bus controller will poll the $\overline{\text{EADS}}$ signal during the boundary between bus cycles. When the host CPU is not utilizing the host bus 202, it will monitor the $\overline{\text{EADS}}$ signal such that when this signal is issued by an external device, the CPU will release the host bus and assert a signal acknowledging, to the respective external device, the grant of the host bus. An external device, such as an arbiter, will issue in turn a bus grant signal to a slave device (not shown). The slave device will then access the host bus 202. The host CPU will subsequently gain access to the host bus when the slave device releases the host bus or when the CPU core 206 issues the internal bus request signal (IBUSREQ) to access this bus and the external device or the arbiter returns the bus to it. In the currently preferred embodiment, the bus cycle is at least two clocks long and begins with the $\overline{\text{ADS}}$ signal 213 active in the first clock and $\overline{\text{RDY}}$ active in the last clock. The $\overline{\text{RDY}}$ signal indicates that a target circuit, such as memory 218, is ready to receive or provide data.

Figure 4:
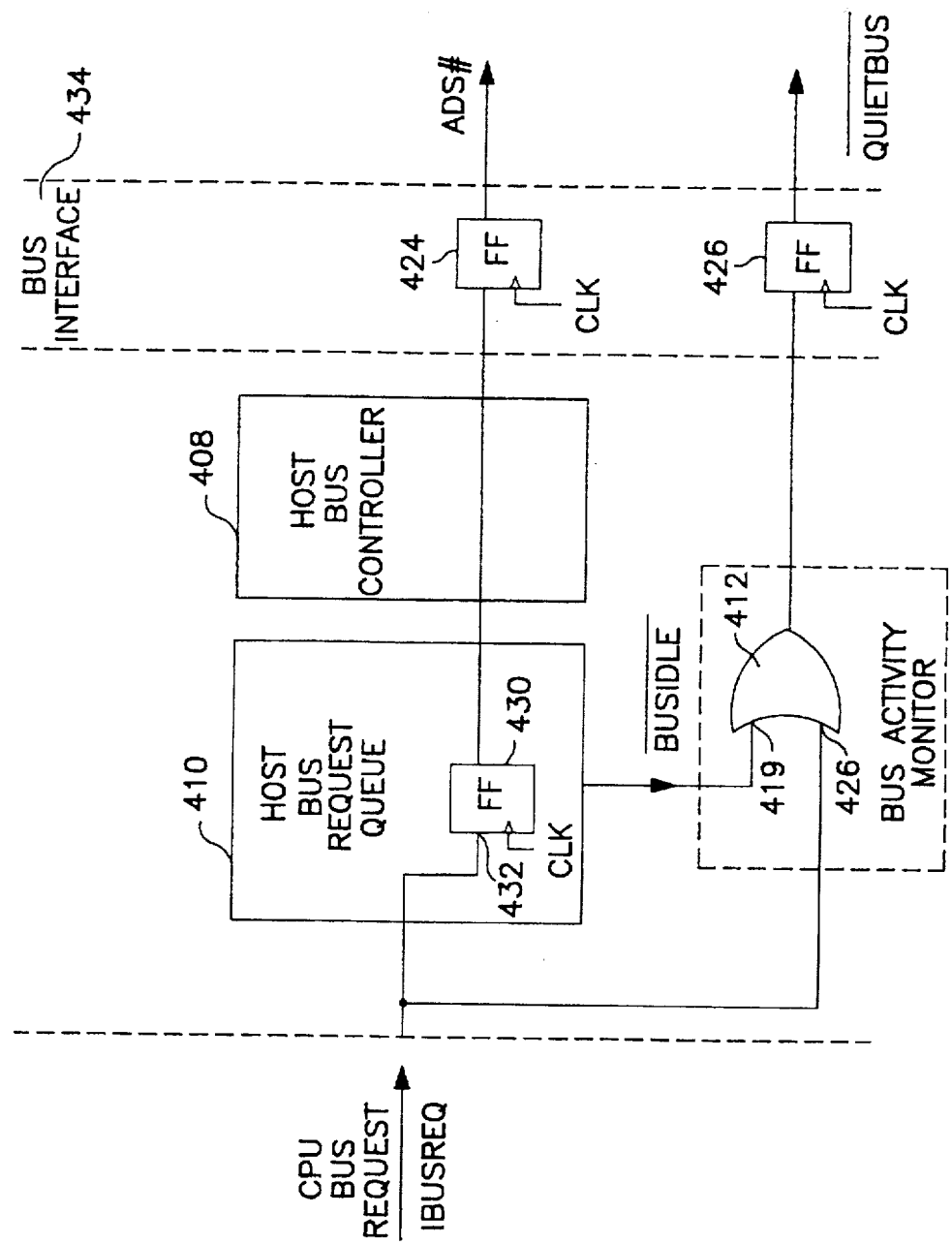
FIG. 4 shows a diagram of the computer system according to the present invention with a bus activity monitor.

FIG. 4 shows a block diagram with the bus activity monitor according to the present invention. The host bus activity monitor 412, according to the present invention, is coupled to host bus controller 408 via host bus request queue 410. The host bus activity monitor 412 can detect a level of activity or lack thereof in the host bus controller 408 by monitoring a $\overline{\text{BUSIDLE}}$ signal from the host bus request queue 410. BUSIDLE is a signal which indicates activity when high, i.e. is set to logic level '1.' Additionally, the host bus activity monitor receives the IBUSREQ signal from the CPU core (not shown). IBUSREQ indicates whether or not an internal bus request has been issued by the CPU core. If both $\overline{\text{BUSIDLE}}$ and IBUSREQ are set to logic "0," then the host bus activity monitor 412 issues a low signal at an output thereof. However, the power to the memory controller can be turned back on if an internal request signal IBUSREQ is received, i.e., IBUSREQ is high. Furthermore, the computer system, according to the present invention, can be extended to other devices which may utilize the host bus, such as devices coupled to a PCI bus. In this case, the power management circuit can receive input from both the host bus controller and from a PCI bus controller (not shown), responsible with a transfer of data between an external device coupled to the PCI bus and the DRAM. More details about this scheme will be provided later in this section.

The host bus request queue 410 typically stores data or addresses awaiting transfer to the host bus via bus controller 408. The host bus controller 408 typically drives the host bus 304 with addresses or data queued in the host bus request queue 410. The host bus controller 408 will also output to the host bus an address strobe signal ($\overline{ADS}$) indicating that the address on the host bus is valid. As one can see in this figure, the host bus request queue 410 includes a delaying device such as flip-flop 430. This flip-flop receives at one of its inputs 432 the IBUSREQ signal and outputs this signal, with a delay of one clock, to the host bus controller 408. This signal is then routed to flip-flop 424, of a bus interface 434, which will synchronize this signal with the clock and output the signal $\overline{ADS}$ in response. The flip-flop 430 is part of a "resumption of activity" circuit which will be explained later in this section.

OR gate 412, which is a non-limiting implementation of the bus activity monitor, receives at input gate 419 the signal $\overline{BUSIDLE}$, indicative of an idle state of host bus controller 402. The $\overline{BUSIDLE}$ signal typically indicates that the host bus request queue 410 is empty and thus, the host bus controller is in an idle state, as no addresses in the host bus request queue are awaiting processing by the host bus controller 408. The output of gate 412 is then input to a flip-flop 426 of the host bus interface 434. Flip-flop 426, which synchronizes the signal output by the bus activity monitor 412, issues in response a $\overline{QUIETBUS}$ signal. The $\overline{QUIETBUS}$ signal indicates activity or lack of activity in the bus controller and the pendency or lack of pendency of internal bus requests from the CPU core. Accordingly, if the $\overline{QUIETBUS}$ signal is '0,' the host bus activity monitor will indicate to the power management circuit (not shown) that the host bus controller 304 is idle and also that no internal requests are pending in the queue 410. Alternatively, when the internal bus request IBUSREQ is set to logic level 1, the $\overline{QUIETBUS}$ signal will shift to logic "1" to timely indicate, to the memory controller, that an internal request for the host bus is pending in the queue 410 and, thus, the memory controller should resume its normal operation.

The resumption of activity in memory controller 416, however, has to be coordinated with the resumption of activity in the host bus controller. The memory controller should, thus, resume its normal operation before a new address is output by the host bus controller 408. Accordingly, in the computer system according to the present invention, the resumption of activity circuit 430 ensures that the $\overline{ADS}$ signal is asserted one bus clock later than the assertion of the $\overline{QUIETBUS}$ signal. The resumption of activity circuit 430, which is implemented, in a no-limiting way, by flip-flop 430 is inserted in the path of the internal bus request signal, thereby delaying by one clock cycle the signal $\overline{ADS}$ relative to the $\overline{QUIETBUS}$ signal Accordingly, the computer system according to the present invention is configured to avoid the situation where the $\overline{ADS}$ signal is asserted before the memory controller becomes operative. No bus cycles will thus be wasted when the CPU core of the host CPU will initiate an access to the DRAM memory after a period of inactivity of the bus controller 408.

Figure 5:
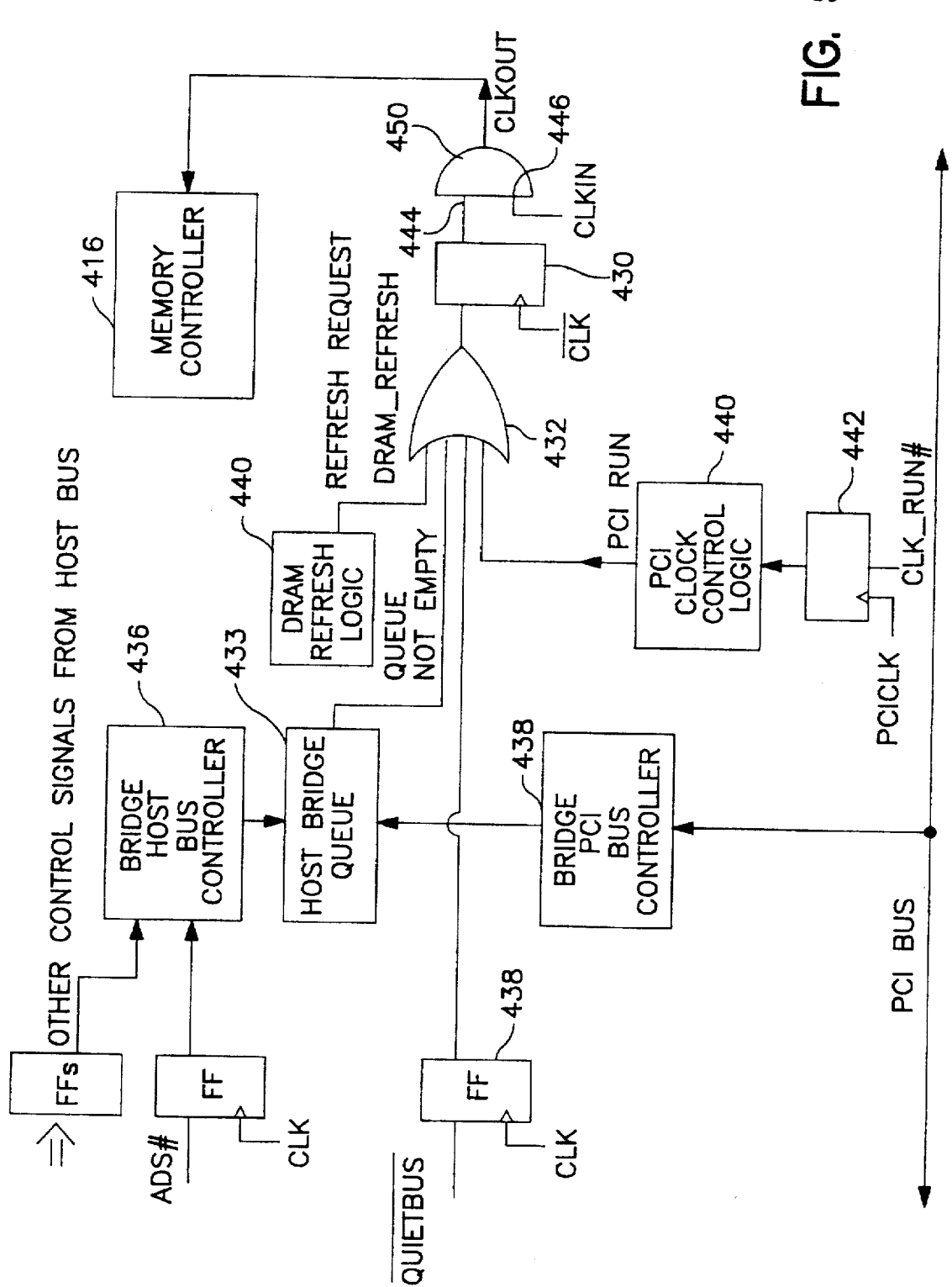
FIG. 5 shows a block diagram of the computer system with the power management circuit.

FIG. 5 further shows a block diagram of the computer system of the present invention with the power management circuit 450. The $\overline{QUIETBUS}$ signal generated by the host processor is input to flip-flop 438. Flip-flop 438 and flip-flop 430 can be part of one single flip-flop which latches the $\overline{QUIETBUS}$ signal at the rising edge of the clock (flip-flop 438). Flip-flop 430 also latches combination of the $\overline{QUIETBUS}$ signal and three more other signals input at the input gate of this flip-flop at the falling edge of the clock signal, to ensure that no glitch will occur when the signals are latched.

OR gate 432 has a first input for receiving a DRAM refresh signal from a DRAM refresh logic circuit 440. The DRAM refresh logic circuit 440 generates a refresh signal periodically every 15.6 microseconds to 256 microseconds. Accordingly, the power management scheme of the present invention takes into account instances where the DRAM needs to be refreshed such that in these instances, the memory controller will not be shut off. OR gate 432 further has a second input for coupling a signal from host bridge queue 433. As one can see, host bridge queue 433 is a queue similar to the host bus request queue 410. The host bridge queue 433 is located in the host bridge and is coupled to a bridge host bus controller 436 and to a bridge PCI bus controller 438. The host bridge queue 433 receives addresses and control signals from blocks 436 and 438 indicating whether an access to the memory is requested by the host CPU or by the PCI bus. If the host bridge queue 433 is not empty, for example, because a request from the PCI bus is pending, a QUEUE NOT EMPTY signal will be driven to a second input of gate 532 such that the memory controller 416 will not be shut off. Some host bridge controllers may have implemented "write posters" for performance reasons. All write operations may be posted (stored) in the queue first, and then be written into the memory. In this case, one needs to wait until the queue is empty before shutting off the memory controller 416.

A third input to OR gate 432 receives the $\overline{QUIETBUS}$ signal described above. A fourth input to the OR gate 532 of the bus activity monitor is coupled to a PCI clock control logic 440. The PCI clock control logic receives a signal $\overline{CLKRUN}$ when PCI clock is running normally. During periods when the PCI clock has been stopped (or slowed), the clock control logic monitors $\overline{CLKRUN}$ to recognize requests, from master and target devices, for changing the state of the PCI clock signal. The PCI clock control logic 440 typically receives requests from external devices coupled to the PCI bus for starting or speeding up the clock i.e., $\overline{CLKRUN}$ will be set at '1.' When CLKRUN is asserted, OR gate 442 will thus generate a PCIRUN signal set to '1' such that the memory controller will be restarted once an external device coupled to the PCI bus requests the starting or speeding up of the clock, much like the way in which assertion of the internal bus cycle request signal (IBUSREQ) causes the memory controller to resume operation.

The power management circuit, in this particular embodiment is an AND gate 450. The AND gate 450 receives at one of its input a signal from the output of flip-flop 430. Flip-flop 430, in turn, receives at its input the signal, generated by the OR gate 432, which indicates whether or not there is or there will be activity on the host bus. As one can see, gate 450 receives at input gate 446 a CLKIN signal which typically sequences the operation of memory controller 416. CLKIN is a clock signal which, generally, would be coupled directly to memory controller 408 in the absence of the power management scheme of the present invention. If the signal received at an input 444 indicates activity on the host bus, then CLKIN will be gated to the output of the power management circuit 450, as CLKOUT. However, if all signals received at the input of gate 432 are low, i.e. the $\overline{\text{QUIETBUS}}$ signal is low, the PCIRUN signal is low, the DRAM refresh signal is low, and the bus bridge queue is empty, then the output of the power management circuit 450 will be 0 and, thus, the clock to the memory controller will be inhibited. The power management scheme of the present invention thus works in the following way. When bus activity is detected on the host bus, or the bus bridge queue is not empty, or the PCI bus is not idle, or the DRAM refresh logic is refreshing the DRAM, the power management circuit 450 will generate a signal CLKOUT at its output which will simply substantially replicate the input signal CLKIN. However, in cases where all the four input signals to gate 432 are low, the power management circuit 450, will generate the signal CLKOUT having a frequency substantially equal to 0. Accordingly, the power dissipated in the memory controller 416 will be substantially reduced in accordance with the equation $$P = C \times V^2 \times F$$

where P represents the power dissipated by the memory controller, C represents the capacitance seen at the input of the memory controller, V is the voltage biasing the memory controller, and F is the frequency of the CLKOUT signal output by the power management circuit 450. As one can see from this equation, when the frequency of the CLKOUT signal is substantially 0, the power dissipated in the memory controller will be substantially reduced, i.e. 0. The computer system according to the present invention confers the capability of controlling the power dissipated in the memory controller 416 according to activity or lack thereof in the host bus or in the PCI bus. Moreover, the computer system according to the present invention includes the resumption of activity circuit which causes the power management circuit to resume sequencing the operation of the memory controller at least one clock cycle before the $\overline{\text{ADS}}$ signal is asserted, such that the memory controller can be fully operative upon receipt of the signal $\overline{\text{ADS}}$ from the bus interface.

The power management scheme of the present invention is not limited to memory controllers. The scheme can be implemented with other devices such as cache controllers, static RAM, etc., by reducing or shutting the power off during periods of idleness. For example, the present invention can be implemented in conjunction with a cache controller which controls the operation of an SRAM memory such as the L2 of Intel Corporation computer architecture. The bus activity monitor could control the power to the cache controller, which in turn would power down the SRAM by using an additional power management circuit in conjunction with the clock of the SRAM. Moreover, in the computer system according to the present invention, the bus activity signal can be multiplexed with another signal connected to a pin already existent on the microprocessor. In such way the present invention can be implemented on computer systems having microprocessors which are pad constrained. Such pin could be any pin existing on the microprocessor which does not have any meaning when there is no activity in the bus controller and therefore the bus is quiet. This pin could be multiplexed with the $\overline{\text{QUIETBUS}}$ signal.

Figure 6:
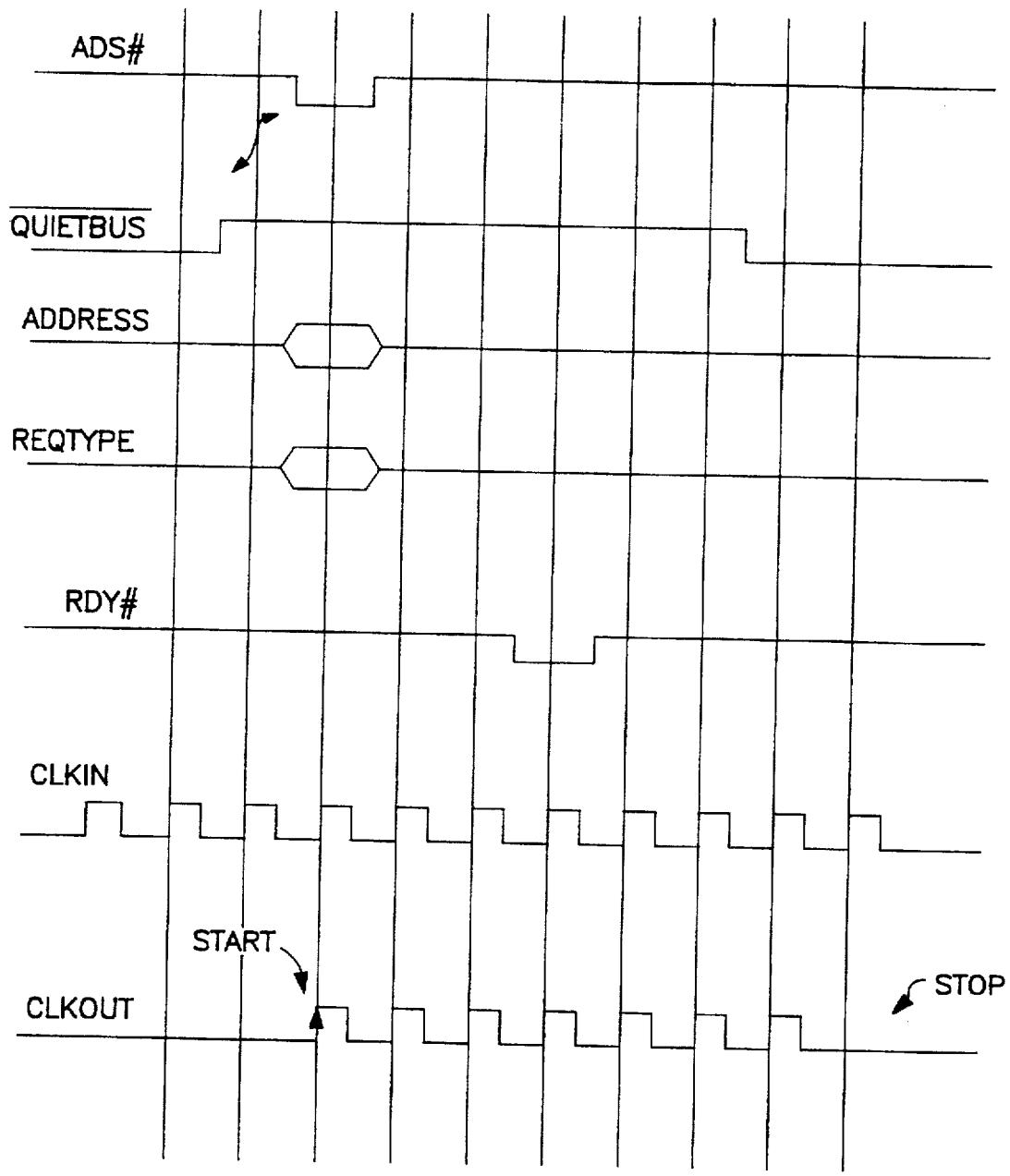
FIG. 6 is a timing diagram illustrating the advantages conferred by the present invention.

FIG. 6 illustrates a timing diagram of the computer system according to the present invention. As one can see, the transition from high to low of the $\overline{\text{ADS}}$ signal indicates that the CPU is driving the bus. Upon this transition the bus will send out an address to the memory controller which will latch that address. As one can see the bus activity signal is $\overline{\text{QUIETBUS}}$ deasserted one bus clock before the $\overline{\text{ADS}}$ signal. As explained above, this assures that the memory controller will become operative before the assertion of the $\overline{\text{ADS}}$ signal. This figure also shows the internal clock signal CLKIN and the external clock signal CLKOUT. The CLKOUT signal, as one can see from this figure, is inhibited while the $\overline{\text{QUIETBUS}}$ signal is low, but is restarted when the $\overline{\text{QUIETBUS}}$ signal is high.

In the foregoing specification, the invention has been described with reference to specific embodiments thereof. It will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A computer system comprising:

a bus;

a processor having a bus controller coupled to said bus, said processor being configured to generate a signal indicating the beginning of a bus cycle;

a bus activity monitor circuit coupled to said bus controller for generating a bus activity signal indicative of activity in said bus controller, said bus activity signal being asserted at least one clock cycle before said signal indicating the beginning of a bus cycle is asserted;

a target controller, coupled to said bus controller, for controlling the exchange of information between said processor and a target circuit, said target controller having an input for receiving a control sequencing signal; and a power management circuit, for controlling a power consumption of said target controller, said power management circuit having an input, for receiving said bus activity signal and an output for generating, responsive to said bus activity signal, said control sequencing signal.

2. The computer system of claim 1 wherein said processor further includes a bus request queue for storing addresses, said bus request queue having a first gate for receiving a bus request (IBUSREQ) signal, said bus request queue having a second gate for generating a signal ($\overline{\text{BUSIDLE}}$) indicative of an idle state of said bus controller.

3. The computer system of claim 2 wherein said bus activity monitor circuit has a first input, for receiving said IBUSREQ signal, a second input, for receiving said $\overline{\text{BUSIDLE}}$ signal, and an output for generating said bus activity signal.

4. The computer system of claim 1 wherein said power management circuit has a first input, for receiving said bus activity signal, a second input, for receiving a clock signal, and an output for generating said sequencing signal.

5. The computer system of claim 1 wherein said processor includes a resumption of activity circuit, said resumption of activity circuit generating said signal indicating the beginning of a bus cycle subsequent to a resumption of activity of said target controller.

6. The computer system of claim 5 wherein said resumption of activity circuit includes first flip-flop latch having an input for coupling to said IBUSREQ signal.

7. The computer system of claim 1 wherein said signal indicating the beginning of a bus cycle is an address valid signal.

8. The computer system of claim 3 wherein said bus activity monitor circuit includes an OR gate having a first input, for receiving said IBUSREQ signal a second input, for receiving said $\overline{\text{BUSIDLE}}$ signal, and an output.

9. The computer system of claim 6 further including a bus interface, said bus interface including a second flip-flop latch having an input for receiving said signal generated by said output of said bus activity monitor, said second flip flop latch further including an output for generating said bus activity signal.

10. The computer system of claim 1 wherein said power management circuit includes an AND gate having a first input, for receiving said bus activity signal, a second input, for receiving a clock signal, and an output for generating said control sequencing signal.

11. The computer system of claim 8 further including a second OR gate having a first input coupled to a DRAM refresh circuit, a second input coupled to said first bus queue, a third input coupled to said bus activity signal, and a fourth input coupled to a PCI clock control logic.

12. The computer system of claim 1 wherein said target controller is a dynamic random access memory (DRAM) controller and said target circuit is a DRAM memory.

13. The computer system of claim 11 wherein said target controller is a cache controller and said target circuit is a static random access memory (SRAM).

14. In a processor having a bus controller coupled to a bus, said bus being coupled to a target controller controlling the exchange of information between a target circuit and said bus, said processor including:

a resumption of activity circuit that generates a signal indicating the beginning of a bus cycle, subsequent to a resumption of activity of said target controller; and a bus activity monitor circuit coupled to said bus controller for generating a bus activity signal indicative of activity in said bus controller, said bus activity signal being asserted at least one clock cycle before said signal indicating the beginning of a bus cycle is asserted.

15. The processor of claim 14 further including a bus request queue for storing addresses, said bus request queue having a first gate for receiving a bus request (IBUSREQ) signal, said bus request queue having a second gate for generating a signal ($\overline{\text{BUSIDLE}}$) indicative of an idle state of said bus controller.

16. The processor of claim 15 wherein said bus activity monitor circuit has a first input, for receiving said IBUSREQ signal, a second input, for receiving said $\overline{\text{BUSIDLE}}$ signal, and an output for generating said bus activity signal.

17. A method for reducing power consumption of a circuit that is coupled to a processor via a bus, the method including the steps of:

turning off power from the circuit if the processor is not using the bus;

determining whether the processor indicates that it will use the bus; and if the processor indicates that it will use the bus, turning on power to the circuit at least one clock cycle before the processor indicates the beginning of a bus cycle.

18. A computer system comprising:

a bus;

a target circuit coupled to the bus;

a processor coupled to the bus, the processor including a resumption of activity control configured to generate a signal indicating beginning of a bus cycle, subsequent to turning on power to said target circuit;

a circuit configured to generate a signal in response to which power is turned ON to the target circuit at least one clock cycle before the processor asserts the signal indicating beginning of the bus cycle.

* * * * *

UNITED STATES PATENT AND TRADEMARK OFFICE
CERTIFICATE OF CORRECTION

| | | |
|---|---|---|
| PATENT NO. | : | 5,692,202 |
| DATED | : | November 25, 1997 |
| INVENTOR(S) | : | Kardach et al. |

It is certified that error appears in the above-identified patent and that said Letters Patent is hereby corrected as shown below:

In column 1 at line 45 delete "inducting" and insert --including--

Signed and Sealed this

Twenty-ninth Day of December, 1998

Attest:

BRUCE LEHMAN

*Attesting Officer*   *Commissioner of Patents and Trademarks*